Sept. 19, 1933.  T. VAN BUUREN  1,927,224

MILK BOILING APPARATUS

Filed April 1, 1932

Inventor:
Theodoor van Buuren

By

Attorney

Patented Sept. 19, 1933

1,927,224

UNITED STATES PATENT OFFICE 1,927,224

MILK BOILING APPARATUS

Theodoor van Buuren, Amsterdam, Netherlands

Application April 1, 1932, Serial No. 602,600, and in the Netherlands November 16, 1931

3 Claims. (Cl. 53—1)

The present invention relates to milk boiling apparatus provided with means for preventing boiling over.

The hitherto known milk boiling apparatus of this kind which are provided at the top with an extended rim have the disadvantage that the warm air coming from the heating flame ascends around the boiling apparatus, as a consequence of which, after the lapse of a certain time, the rim becomes heated to such an extent that the milk which boils over into the said rim is no longer sufficiently cooled down and as soon as this occurs splashes over the rim. With milk boiling apparatus of this kind there is thus no absolute guarantee that the milk will not boil over.

It is the principal object of the present invention to remove this disadvantage and with this object in view the invention is characterized in that the boiling apparatus is provided at its upper part with a somewhat upwardly inclined spout or channel member of such dimensions that the rising, boiling milk which penetrates into the said spout or channel member is continuously cooled down therein to the necessary extent and flows back into the boiling apparatus. Inasmuch as the greater part of the said spout or channel member is located beyond the range of the warm air rising around the boiling apparatus, the spout or channel member is cooled down by the external air in such manner that it is absolutely impossible for the rising, boiling milk to boil over even after the expiration of considerable time.

In addition to this the milk boiling apparatus according to the invention has the advantage as compared with all the known milk boiling apparatus provided with means for preventing boiling over, that the skin of milk which is formed after the boiling milk has risen is deposited in the spout or channel member and forms therein as it were a miniature dam which is carried away when the milk is poured out so that none of the particles of fat or nutritive material can become lost—which is not the case with the known milk boiling apparatus. The milk boiling apparatus according to the invention consequently also remains free from deposited adhering skin, as a result of which it can be very readily cleaned without the expenditure of any appreciable time. Finally, it may be mentioned that the manufacture of the milk boiling apparatus according to the invention is very inexpensive and that the said milk boiling apparatus can be very easily manipulated when in use.

A preferred constructional form of a milk boiling apparatus according to the invention is illustrated by way of example in the accompanying drawing, in which.

Figure 1:
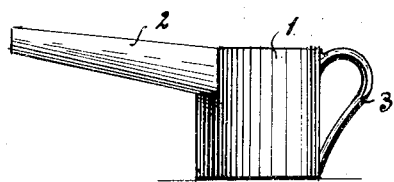
Fig. 1 shows a boiling apparatus according to the invention in side view.
Figure 2:
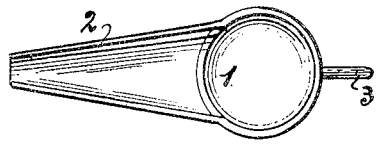
Fig. 2 shows the apparatus in plan.

Referring to the drawing:

The reference numeral 1 denotes the boiling apparatus proper, the reference numeral 2 denotes the spout or channel member for the reception of the rising, boiling milk and the reference numeral 3 denotes the handle.

The said result may, for example, be attained if the spout or channel member 2 has a length of about one and a half times the diameter of the boiling vessel 1, opens into the vessel at a height which is two-thirds of the total height of the vessel and has at its junction with the boiling vessel a cross section, the vertical height of which is about one-third of the diameter of the said vessel and if the height of the vessel is about two-thirds of its diameter. By making the spout or channel member and the boiling vessel proper of these dimensions the result aimed at is ensured at all normally occurring atmospheric temperatures assuming of course that the source of heat and the materials of which the spout or channel member and the boiling vessel proper are constructed are such as are usually employed. With these dimensions the capacity of the boiling vessel proper will be about three times the capacity of the spout or channel member. The spout or channel member 2 is preferably made somewhat narrower towards the end in order that the operation of pouring out may be facilitated.

Before use the boiling apparatus proper 1 is filled with milk approximately up to the lower edge of the spout or channel member 2 whereupon the heating operation takes place. When the boiling milk rises it penetrates into the spout or channel member 2 and in view of the fact that the latter is cooled continuously to a sufficient extent inasmuch as its major part is located outside of the range of the rising warm air, flows back into the boiling apparatus proper 1.

I claim as my invention:

1. A milk boiling apparatus comprising a boiling vessel, an open-topped channel member communicating with the upper portion of the boiling vessel, said channel member being upwardly inclined from the boiling vessel so that milk boiled over into the channel member will be returned to the boiling vessel, and said channel member being of a length greater than the diameter of the boiling vessel.

2. A milk boiling apparatus comprising a boiling vessel adapted to be heated, an open-topped channel member communicating with the upper portion of the boiling vessel and projecting substantially laterally therefrom, said channel member being of a length sufficiently great so that the major portion thereof will be at a temperature lower than the temperature of the heated boiling vessel whereby milk overflowing into the channel will be cooled, and the bottom of said open-topped channel being inclined upwardly from the boiling vessel so that the cooled milk will flow back into the boiling vessel.

3. A milk boiling apparatus comprising a boiling vessel adapted to be heated, an open-topped channel member communicating with the upper portion of the boiling vessel and projecting substantially laterally therefrom, said channel member having the free end thereof closed to retain milk overflowing from the boiling vessel and being of a length sufficiently great so that the major portion thereof will be at a temperature lower than the temperature of the heated boiling vessel whereby milk overflowing into the channel will be cooled, and the bottom of said open-topped channel being inclined upwardly from the boiling vessel so that the cooled milk will flow back into the boiling vessel.

THEODOOR van BUUREN.